United States Patent
Auvinen et al.

(10) Patent No.: US 11,440,753 B2
(45) Date of Patent: Sep. 13, 2022

(54) LOADING FRAME, SYSTEM, AND METHOD FOR LOADING ARTICLES

(71) Applicant: ACTIW OY, Naarajarvi (FI)

(72) Inventors: Janne Auvinen, Pieksamaki (FI); Jari Vartiainen, Naarajarvi (FI)

(73) Assignee: ACTIW Oy, Naarajarvi (FI)

( * ) Notice: Subject to any disclaimer, the term of this patent is extended or adjusted under 35 U.S.C. 154(b) by 0 days.

(21) Appl. No.: 16/973,079

(22) PCT Filed: Jul. 1, 2019

(86) PCT No.: PCT/FI2019/050516
§ 371 (c)(1),
(2) Date: Dec. 8, 2020

(87) PCT Pub. No.: WO2020/002779
PCT Pub. Date: Jan. 2, 2020

(65) Prior Publication Data
US 2021/0245976 A1   Aug. 12, 2021

(30) Foreign Application Priority Data

Jun. 29, 2018 (FI) ..................... 20185608

(51) Int. Cl.
| | | |
|---|---|---|
| *B65G 67/20* | (2006.01) | |
| *B65G 65/32* | (2006.01) | |
| *B65D 88/12* | (2006.01) | |
| *B65F 9/00* | (2006.01) | |

(52) U.S. Cl.
CPC .............. *B65G 67/20* (2013.01); *B65G 65/32* (2013.01); *B65D 88/129* (2013.01); *B65F 9/00* (2013.01)

(58) Field of Classification Search
CPC ........ B65G 67/20; B65G 65/32; B65G 65/30; B65G 65/00; B65G 67/06; B65G 67/04; B65G 67/02; B65D 88/129; B65D 88/54; B65F 9/00; B64D 9/00; B64C 1/22
See application file for complete search history.

(56) References Cited

U.S. PATENT DOCUMENTS

| | | | |
|---|---|---|---|
| 3,809,264 A | | 5/1974 | Mayers |
| 4,743,157 A | | 5/1988 | Takatsuki |
| 5,046,690 A | * | 9/1991 | Nordstrom ............... B64D 9/00 244/137.1 |

(Continued)

FOREIGN PATENT DOCUMENTS

| | | |
|---|---|---|
| CN | 1387414 | 12/2002 |
| CN | 1655992 | 8/2005 |

(Continued)

OTHER PUBLICATIONS

International Search Report in PCT/FI2019/050516 dated Sep. 24, 2019.

(Continued)

*Primary Examiner* — Glenn F Myers
(74) *Attorney, Agent, or Firm* — Fildes & Outland, P.C.

(57) ABSTRACT

A loading frame includes a base and two walls arranged on opposite sides of the base. The walls are flexible and are arranged to permit movement, preferably sliding, between the wall and the load space's side, the wall being supported on the side. A system and a method for loading articles utilize the loading frame.

13 Claims, 9 Drawing Sheets

(56) References Cited

U.S. PATENT DOCUMENTS

| | | | |
|---|---|---|---|
| 5,054,987 A | 10/1991 | Thornton | |
| 6,959,714 B1 | 11/2005 | Hakansson et al. | |
| 7,275,906 B1 * | 10/2007 | Pool | B65F 9/00 |
| | | | 414/395 |
| 8,251,634 B2 * | 8/2012 | Kauhanen | B65G 67/20 |
| | | | 414/809 |
| 8,662,813 B2 | 3/2014 | Bushong | |
| 9,738,464 B1 | 8/2017 | Sakajian | |
| 10,428,577 B2 | 10/2019 | Viinonen et al. | |
| 2006/0078410 A1 * | 4/2006 | Frankel | B65D 88/54 |
| | | | 414/404 |
| 2008/0219818 A1 * | 9/2008 | Adams | B65G 67/20 |
| | | | 414/404 |
| 2012/0107075 A1 | 5/2012 | Uhrick et al. | |
| 2016/0194165 A1 | 7/2016 | Auvinen et al. | |

FOREIGN PATENT DOCUMENTS

| | | |
|---|---|---|
| CN | 204303784 | 4/2015 |
| CN | 105555687 | 5/2016 |
| CN | 106103320 | 11/2016 |
| GB | 2213719 | 8/1989 |
| GB | 2 451 631 | 2/2009 |
| JP | H04-159926 | 6/1992 |
| KR | 87-10158 | 7/1987 |

OTHER PUBLICATIONS

Chinese Search Report in corresponding Chinese Application No. 201980041989.1 dated Sep. 29, 2021 and English language translation.
English language abstract of CN 1655992.
English language abstract of CN 204303784.
Extended European Search Report in European Patent Application No. 19827042.3 dated Feb. 22, 2022.
English language abstract for H04-159926.
English language machine translation of H04-159926.

* cited by examiner

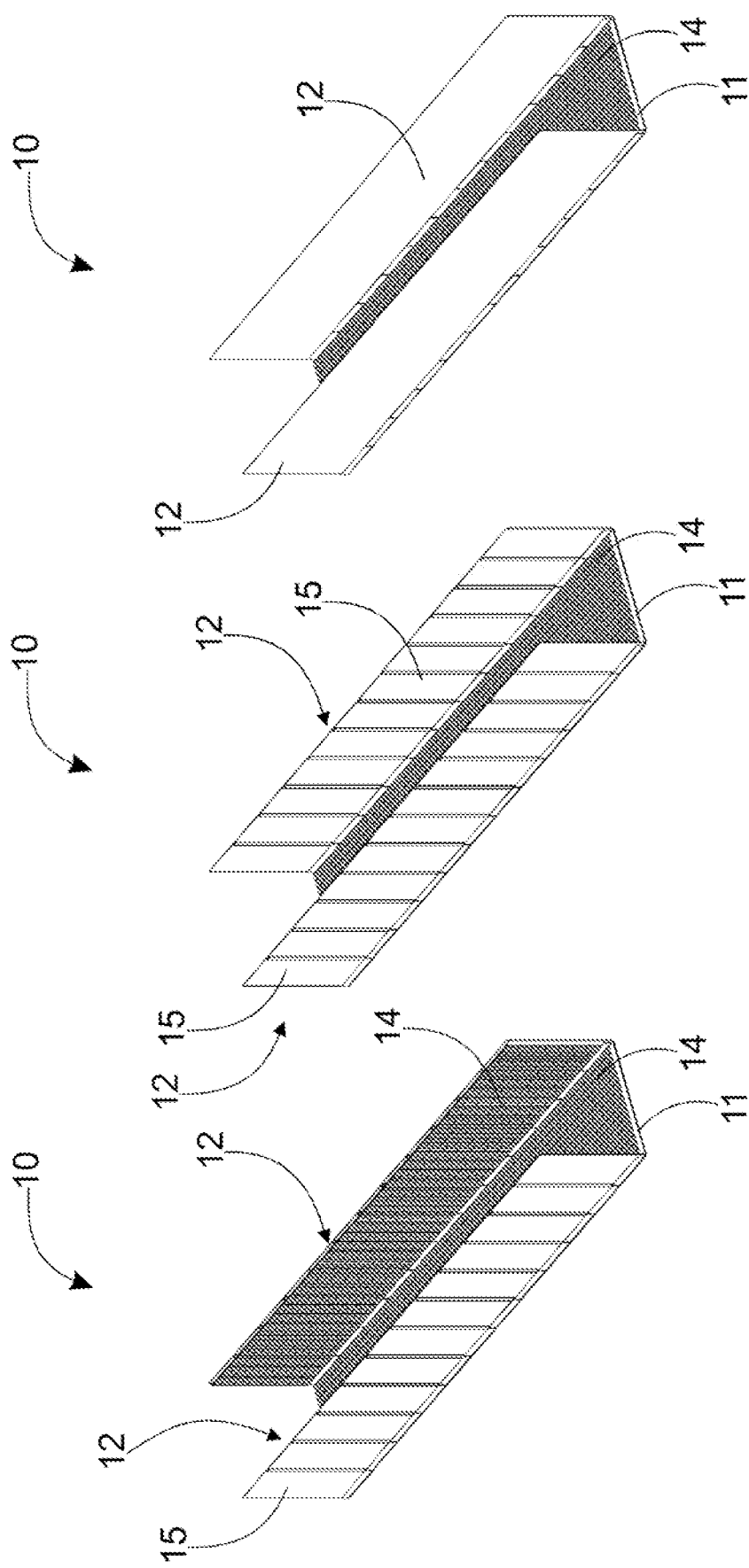

LOADING FRAME, SYSTEM, AND METHOD FOR LOADING ARTICLES

CROSS-REFERENCE TO RELATED APPLICATIONS

This application claims benefit of priority from International Patent Application No. PCT/FI2019/050516 filed Jul. 1, 2019, which claims benefit of priority from Finland Patent Application No. 20185608 filed Jun. 29, 2018, both of which are incorporated by reference in their entirety.

FIELD OF THE INVENTION

The invention relates to a loading frame for loading articles, which loading frame includes a base and two walls arranged on opposite sides of the base. The invention also relates to a system and method for loading articles requiring support.

BACKGROUND OF THE INVENTION

Racks, which support the articles not only on a base but also from two sides, are used to store goods requiring support, such as, for example, tyres or sacks. The stacked articles will then remain vertical during storage and transportation. At its simplest, there is a base and two ends in the rack. Tyres, for example, can be stacked between the ends and the tyres can then be moved to a desired location without the stacks toppling. The rick-rack stacking procedure has been specially developed for tyres. Tyres can be stacked in the rack, for example, using a robot.

With suitable dimensioning, racks can also be used for long-distance transport. The racks, together with the articles, are then moved into a load space, such as, for example, a container or vehicle. However, the racks take up some of the load space while, on the other hand, part of the load space remains unused. The racks also take up part of the payload. In addition, the racks must be returned to the sender, which increases the logistics costs.

U.S. Pat. No. 8,662,813 discloses a system for loading a bulk material. In this system, a load bin is used. The load bin is a strongly-built box, which includes a base and two opposite walls. The outermost end of the box is closed by a packer blade, the shape of which corresponds to the inner shape of the box. The box's other end is open. In practice, the box is filled with bulk material from above, for example, using a grab. The full box is pushed in its entirety into the load space, the packer blade moving with it. The box is then pulled out of the load space, while the packer blade remains in place. In other words, the packer blade prevents the bulk material from moving back along with the box. The bulk material then remains in the load space while the box moves to be filled again. Before filling, the packer blade is moved back to the outer end of the box. Use of the system certainly avoids moving the load bin along with the products to be transported and the load space is effectively filled. However, the box is heavy and is only suitable for bulk material. In addition, the walls of the heavy box damage the sides of the load space, unless the load space is precisely aligned with the box. The box's walls, like its base too are thick, which takes up a significant part of the capacity of the load space. In other words, when the box is pulled out the load space remains incompletely filled.

SUMMARY OF THE INVENTION

The invention is intended to create a new type of loading rack for loading articles, which is more diverse than before, as well as being faster and more careful. In addition, the invention is intended to create a new type of system and method, which utilizes the loading rack. Accordingly, the loading frame includes a base and two walls arranged on opposite sides of the base. The walls are arranged to permit movement between the wall and the side of the load space. The walls are flexible, and the base and the walls are of flexible slippery plastic for sliding when the wall is supported on the side of the load space. The loading rack according to the invention is suitable for many different kinds of articles and will break neither the articles nor the load space. In the method according to the invention, loading racks are used, by which the load space can be loaded considerably faster than usual and to be fuller than before. At the same time, however, the return transport of the loading racks is avoided. In addition, the capacity of the robot used to handle the goods can be exploited maximally. The system is simple and its capacity can be increased easily.

BRIEF DESCRIPTION OF THE DRAWINGS

In the following, the invention is described in detail with reference to the accompanying drawings showing some embodiments of the invention, in which FIG. 1a shows a first embodiment of the loading rack according to the invention, FIG. 1b shows a second embodiment of the loading rack according to the invention, FIG. 1c shows a third embodiment of the loading rack according to the invention.

DETAILED DESCRIPTION OF THE INVENTION

Figure 2A:
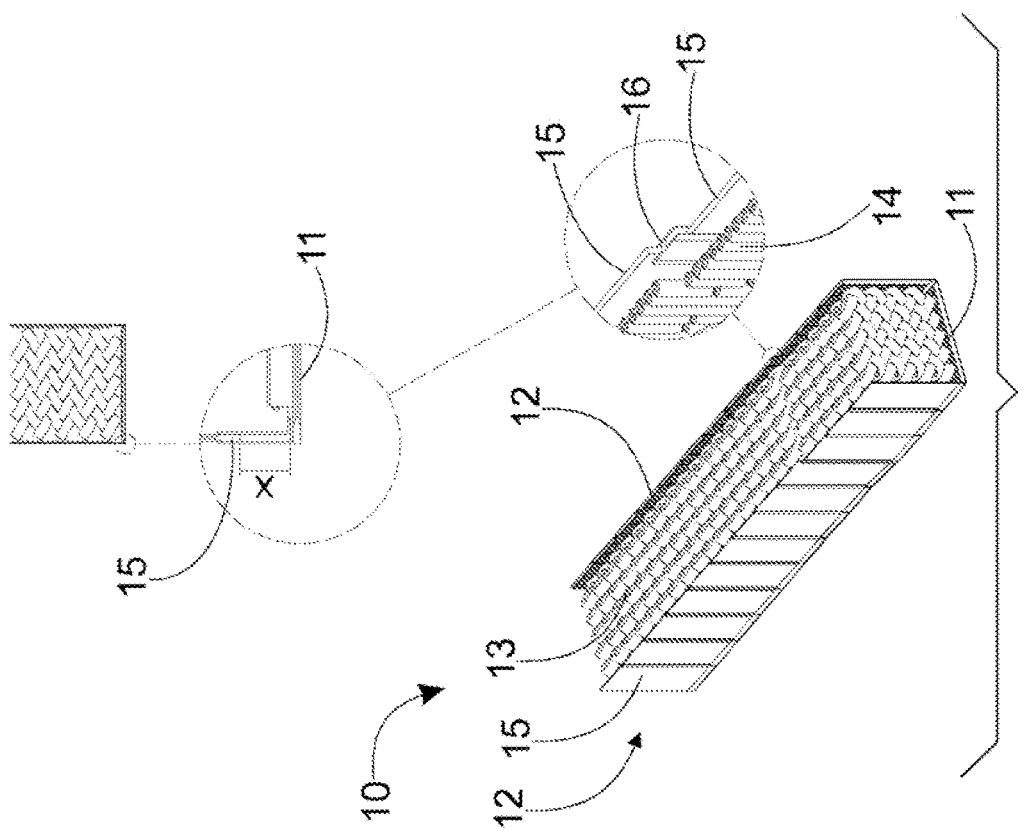
FIG. 2a shows the loading rack of FIG. 1a filled with tyres on a flat base.

FIGS. 1a-c show embodiments of the loading frame according to the invention. The invention thus relates to a loading frame for loading articles. The loading frame is particularly suitable for loading articles requiring support. Such articles are, for example, tyres, bagged goods such as cement, and other similar products. On the other hand, the loading frame is also suitable for loading articles requiring protection. In general the loading frame 10 includes a base 11 and two walls 12 arranged on opposite sides of the base 11. In practice, the base is elongated and dimensioned according to the load space. In addition, the walls are arranged on the long sides of the base and the walls are essentially the length of the base. Stacks formed of the articles are then supported on either or both walls, thus remaining in the desired position. The loading frame is, however, open at the ends. In the invention, the walls 12 are flexible and are arranged to permit movement between the wall 12 and the side of the load space, preferably sliding when the wall 12 is supported on the side. The structure of the loading frame is then simple and light, which facilitates loading. At the same time, the load space is filled better than before. In addition, the loading frame can be utilized in a new and surprising manner.

The walls are preferably also arranged to permit movement between the articles 13 and the loading frame 10. The loading frame can then be pulled out of the load space without damaging the articles and upsetting the stacks.

The aforementioned permitting of movement can be implemented in various ways. In the invention, the base 11 and walls 12 are of flexible slippery plastic. Firstly, the base and walls too are flexible, thus conforming to the shapes of the load space. Secondly, the articles slide on the surface of the slippery plastic without breaking. At the same time, the walls can be supported on the load space's sides. Thus in practice the walls can slide along the load space's sides as the base slides along the load space's floor. In the embodiment of FIG. 1*c*, the base 11 and walls 12 are in themselves unified slippery-plastic pieces. The greatest loading and thus friction are against the base. Therefore in the embodiment of FIG. 1*c* the inner surface of the base 11 is covered with freely rotating rollers 14. The articles then roll lightly on top of the base.

In FIGS. 1*a-b*, the walls 12 are formed of parallel components 15, which are attached flexibly to each other. The loading frame then conforms to the shapes of the load space's side walls. In addition, the wall and its components are attached flexibly to the base. Overloading and deformation of the walls is then avoided as the base conforms to the shapes of the load space's floor or to differences in height between the transfer device and the load space. If necessary, the inner surface of the wall 12 too is covered with freely rotating rollers 14, so that friction between the articles and the wall is negligible (FIG. 1*a*). Generally, the friction properties of the loading frame's inner and outer surfaces are arranged to suit each purpose. The slippery plastic can be unified or formed of two thinner slippery plastic sheets. In a multi-layer solution, reinforcing sheets can be used if required between the layers, the contact of which with the articles and load space sides is prevented.

Figure 2B:
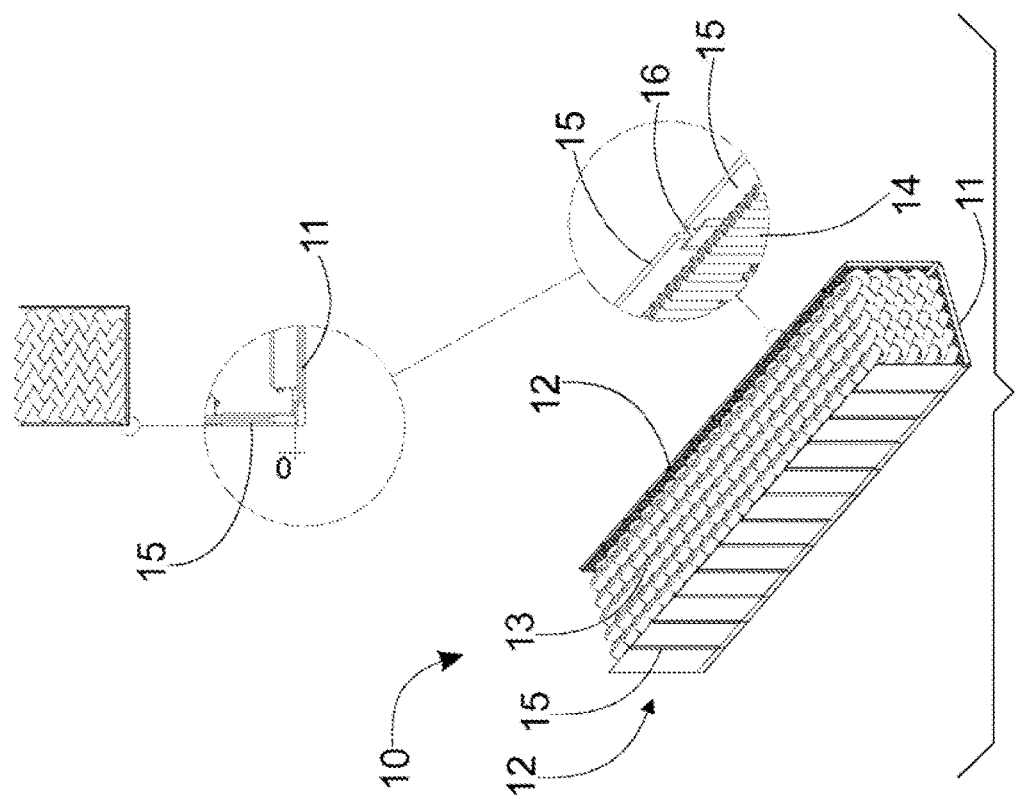
FIG. 2b shows the loading rack of FIG. 2a on an uneven base.

FIGS. 2*a* and 2*b* show a loading frame 10 according to the invention covered inside with freely rotating rollers, fully loaded with tyres. Here there is a floating connector piece between the wall's 12 components 15, which permits the vertical movement of the component 15 and also a slight difference of angle between the components while the wall line remains straight however. The wall 12 component 15 is correspondingly attached floatingly to the base 11, which for its part permits the aforesaid movements. At the connection points there can even be pivots or similar, which permit the wall to flex. In FIG. 2*a*, all the components 15 of the wall 12 are on the same plane. In FIG. 2*b*, due to bending of the base 11 a difference in height has formed between the components 15, which then permits the loading frame to conform to the shapes of the base and load space walls without breaking.

Figure 3B:
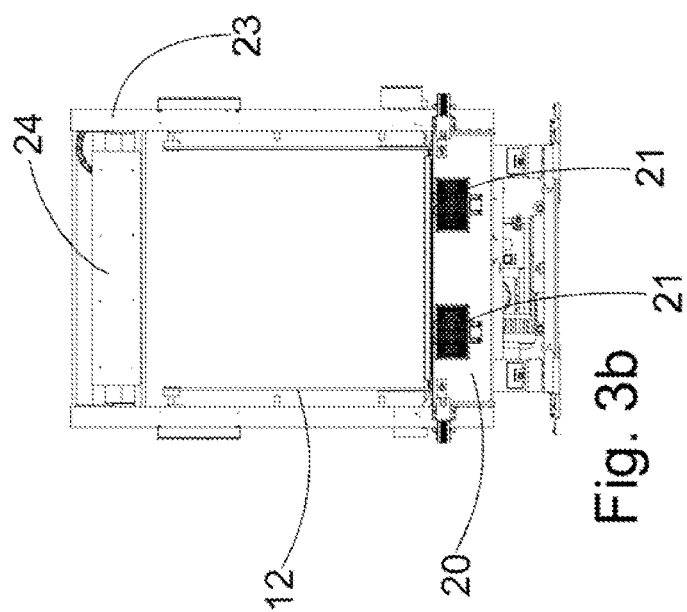
FIG. 3b shows a front view of the transfer device of FIG. 3a, FIG. 3c shows a schematic diagram of the system according to the invention.
Figure 3A:
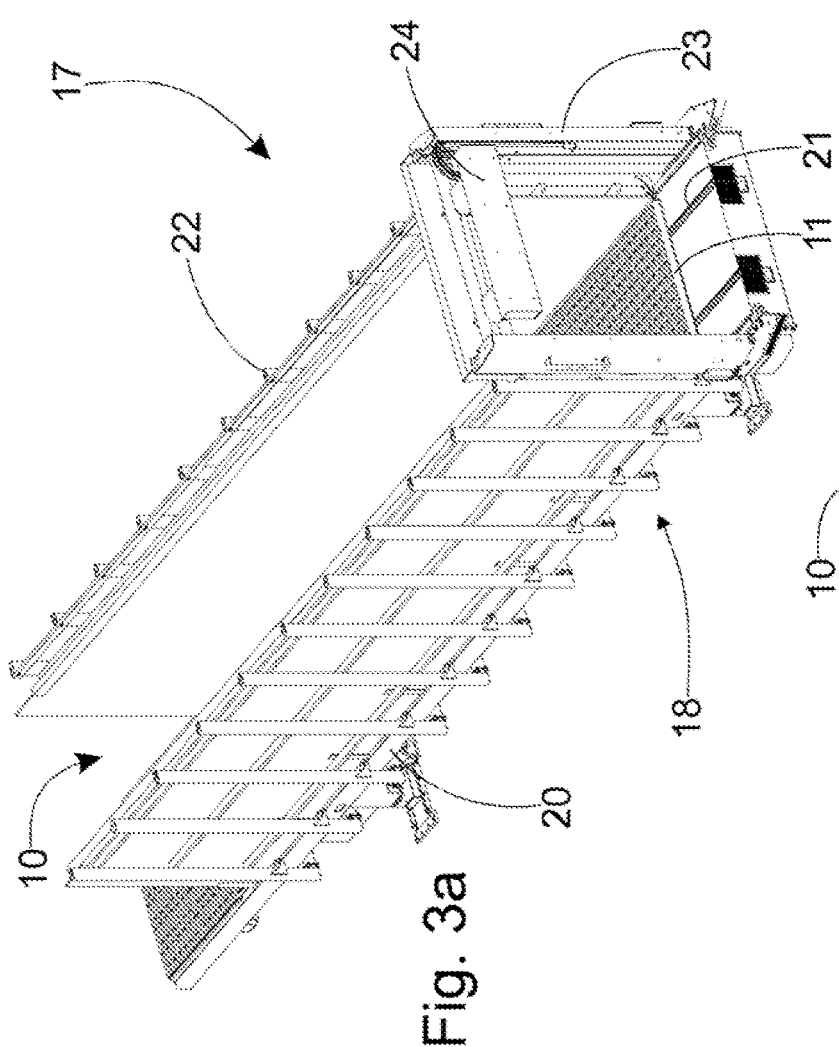
FIG. 3a shows the loading rack according to the invention, fitted to a transfer device.
Figure 3C:
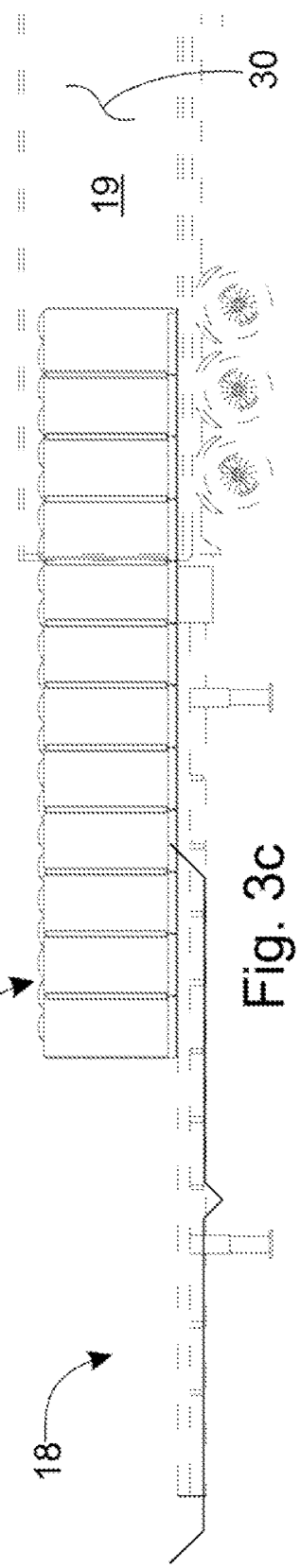

The loading frame according to the invention is applied in the system shown in FIG. 3*c*. The system thus includes the loading frame 10 described above and the device 17 for handling the loading frame 10. In the invention, the device 17 is a transfer device 18, which is arranged to both move the loading frame 10 together with the articles 13 into the load space 19 and to move the load frame 10 out of the load space 19 while the articles 13 remain in the load space 19. In FIG. 3*c*, the loading frame 10 filled with articles 13 is already partly inside the load space 19.

FIG. 3*a* shows a transfer device 18, which in its basic construction can be a LoadMatic device developed by the applicant. In the transfer device 18 is a self-supporting frame 20, inside which are transfer chains 21 to move the loading frame 10. Here there are vertical supports 22 arranged next to each other in the frame 20, on which at least the upper parts of the walls 12 can be supported (FIG. 3*b*). The loading frame then remains in shape when fully loaded and on the transfer device. After the gate 23 in the transfer device 18 the loading frame 10 and its walls 12 are supported on the sides 30 of the load space 19 (FIG. 3*c*). More generally, the walls are supported on the articles and/or on the load space's sides. The support is made possible by the flexible walls and suitable friction properties on the walls' outer surfaces. The walls then move along the load space's sides.

In the invention, the length of the base 11 and walls 12 is at least the length of the load space 19 being loaded. The whole load space can then be loaded at one time, which accelerates loading and ensures precise utilization of the load space. The transfer device 18 is preferably arranged outside the load space 19 as a continuation of the load space 19. The load space is then loaded to the rear, without devices entering the load space.

Figure 6:
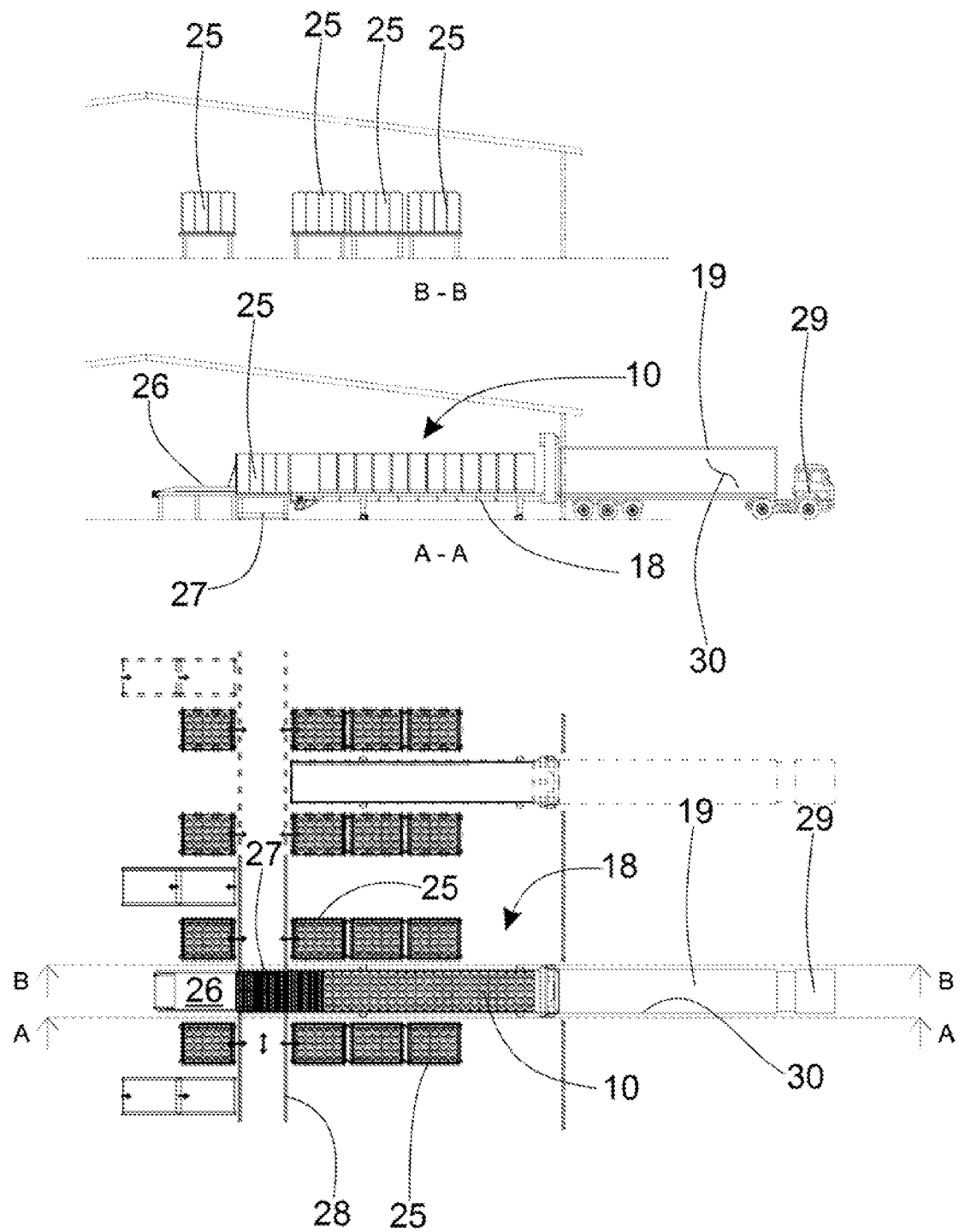
FIG. 6 shows the third stage of the method according to the invention.
Figure 7:
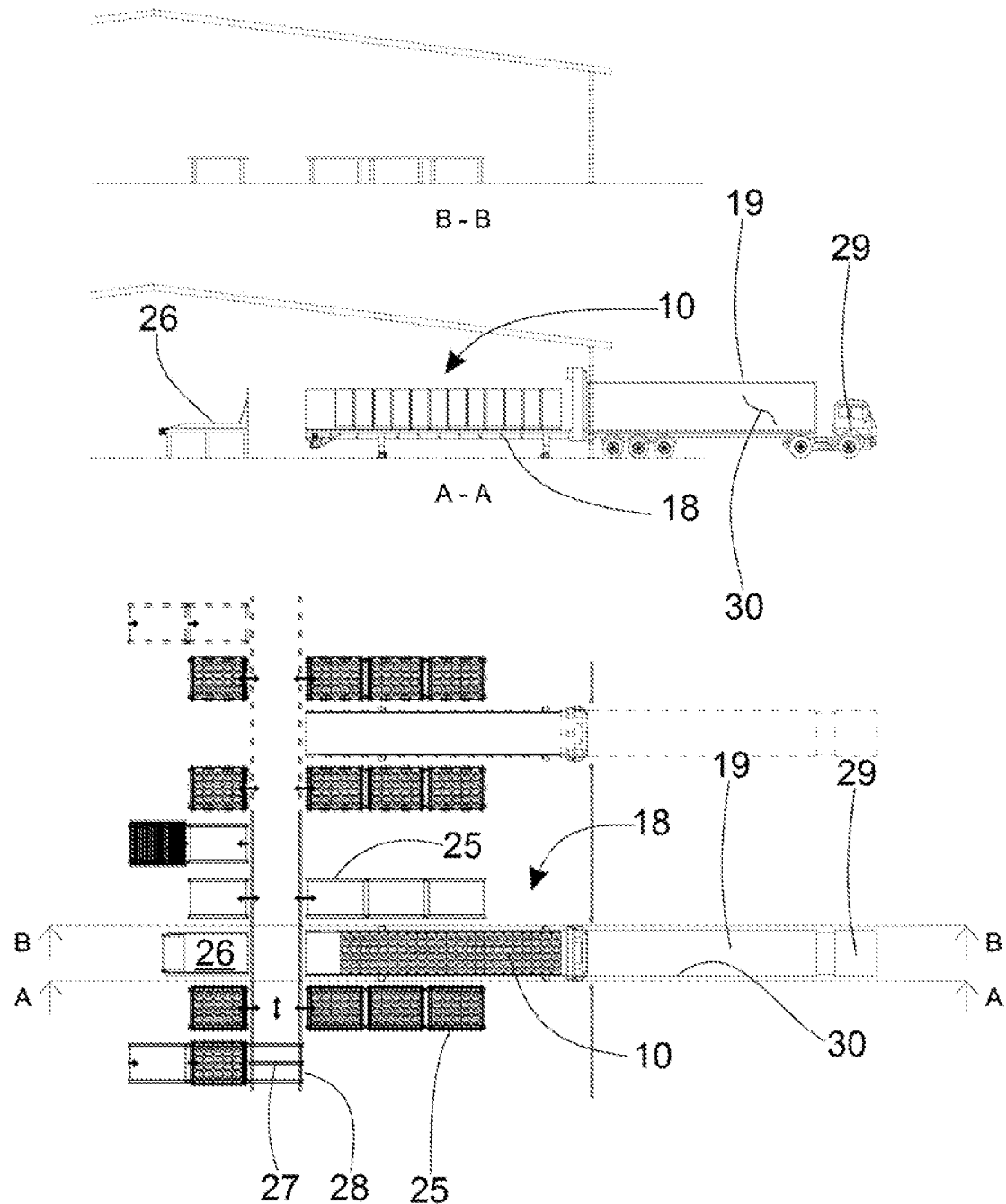
FIG. 7 shows the fourth stage of the method according to invention.
Figure 8:
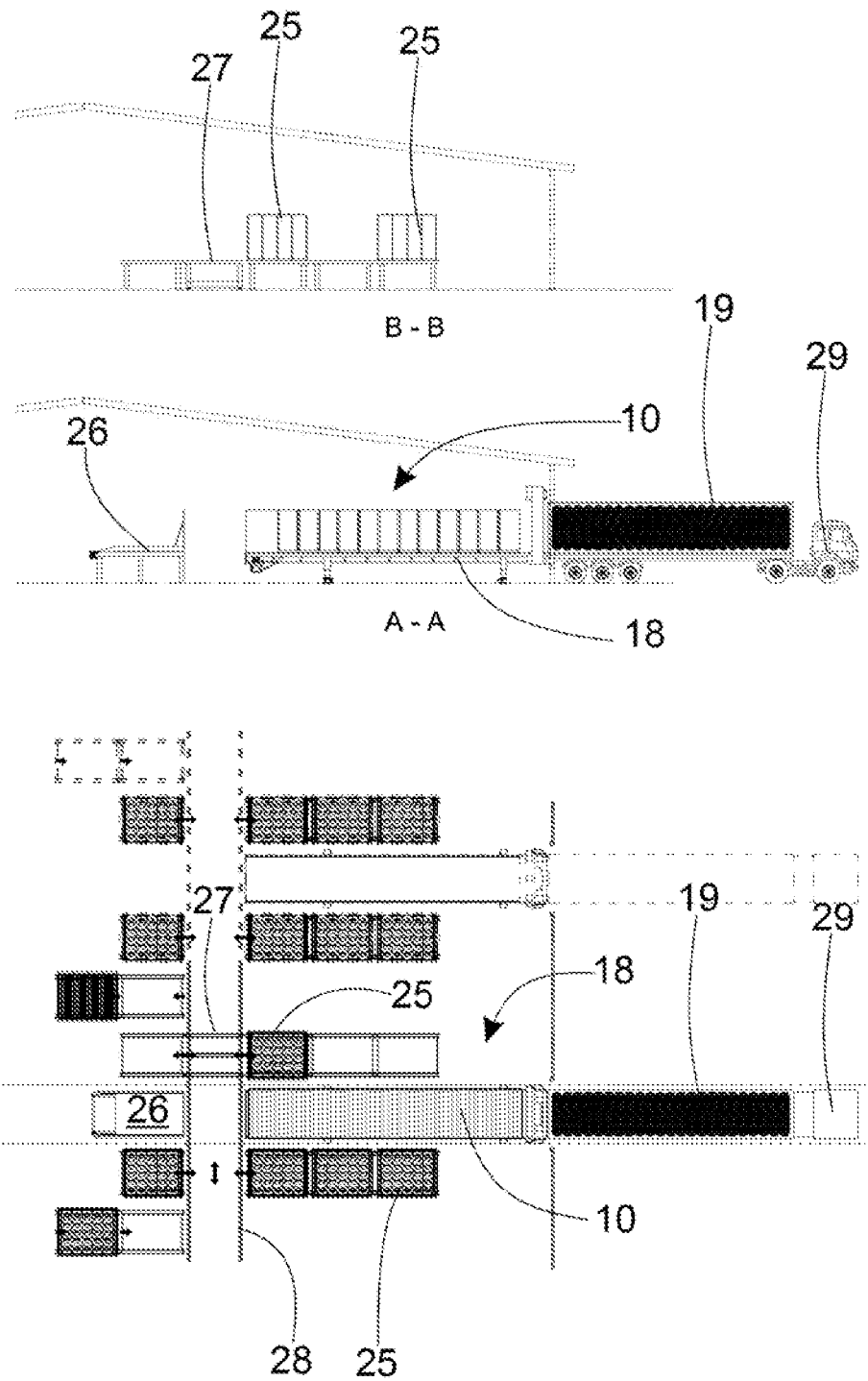
FIG. 8 shows the fifth stage of the method according to the invention.

FIGS. 4-8 show different stages of the method according to the invention. The lower parts of FIGS. 4-8 show example layouts and two side views at points A and B. In the method, articles 13 are loaded into the aforementioned loading frame 10. Then the loading frame 10 with the articles 13 is moved into the load space 19 (FIG. 8). In the invention, the walls 12 are arranged to be flexible and permit movement between the wall 12 and the load space's 19 side 30, preferably sliding, as the walls 12 are supported during the transfer on the articles 13 and/or the load space's 19 sides 30. Thus loading succeeds as the base and walls flex and the walls move supported by the sides. This also avoids damage to the sides and articles. Particularly slippery plastic walls without rollers protect the articles themselves during loading.

In practice the loading frame 10 is moved out of the load space 19 while the articles 13 remain in the load space 19. Before pulling out, a buffer beam 24 is lowered in front of the articles in the gate 23 of the transfer device 18. There is a suitable gap between the buffer beam 24 and the gate 23, so that the loading frame 10 can be pulled back on top of the transfer device 18 when the buffer beam is in the lowered position. In practice loading is quick and the loading frame remains in the loading area to wait for the next loading. In other words, only the articles, which were supported during loading by the loading frame, remain in the load space. All in all, loading of the load space takes at most half an hour.

The loading frame can be loaded, for example, by a robot. For example for a forty-foot container purely the load formation in the loading frame would last for several hours. Thus, in the method according to the invention, before loading of the load space, the loading frame 10 is filled with pre-filled buffer frames 25. The buffer frame can be rigid or flexible, but is preferably covered on its inner side with freely rotating rollers. Simple slippery plastics can also be used, as in the loading frame itself.

More specifically, the system includes buffer frames 25 as well as a buffer bar 26 for transferring the articles from the buffer frame 25 to the loading frame 10. The dimensioning of the buffer frame corresponds essentially to the dimensions of the loading frame. Thus when using the buffer bar the buffer frame is end-on to the loading frame. FIG. 6 shows the work movement of the buffer bar 26. In addition, the system includes a transfer carriage 27 for transferring the buffer frame 25 to the loading frame 10 arranged at the location of the transfer device 18. In practice, loading takes place as follows. Buffer frames 25 filled with articles from storage or directly from production are brought close to the transfer device 18. The buffer frames 25 are preferably located in the immediate vicinity of the transfer device 18. The transfer carriage 27 has a simple track 28 and the transfer carriage is used to receive in-coming buffer frames, move the buffer frames next to the transfer device and then to the buffer bar, and finally away to be refilled.

Figure 4:
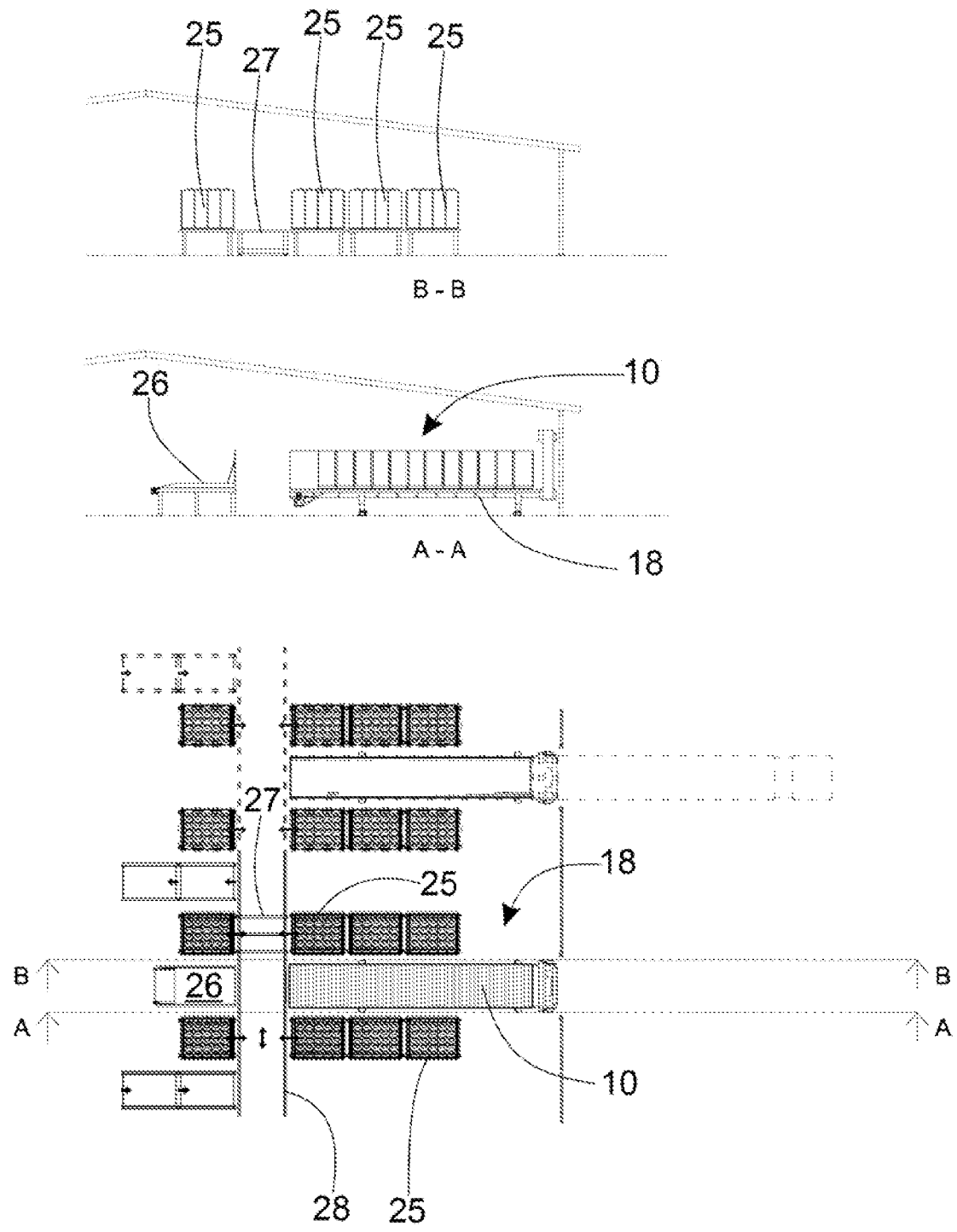
FIG. 4 shows one stage of the method according to the invention.
Figure 5:
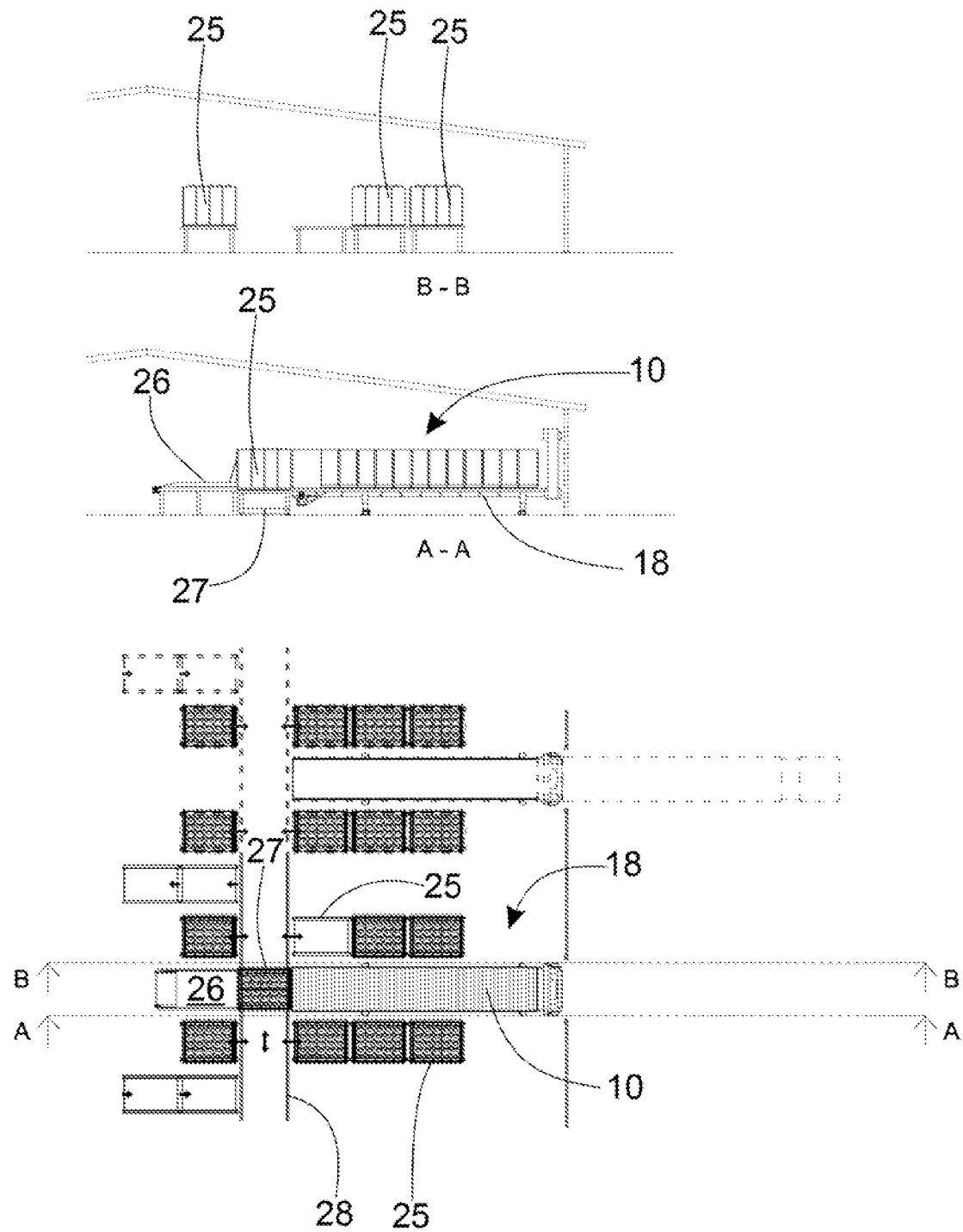
FIG. 5 shows the second stage of the method according to the invention.

In FIG. 4, eight buffer frames 25 full of tyres have been brought ready on both sides of the transfer device 18. The transfer carriage 27 is at the upper row of buffer frames, ready to receive a buffer frame. In FIG. 5, the transfer carriage 27 together with one buffer frame has moved between the buffer bar 26 and the transfer device 18 equipped with the loading frame 10. In FIG. 6, the fourth buffer frame of tyres is being pushed into the loading frame 10. The loading frame 10 is then full. More generally, the loading frame is filled using two or more buffer frames. Once the loading frame has filled the transport means 29 with the load space 19 can be brought to the transfer device 18.

In the stage of FIG. 7, loading of the actual load space 19 is proceeding. Then the transfer device 18 is connected to the load space 19 and then the loading frame 10 with the articles is pushed into the load space 19. At the transfer device 18 the walls of the loading frame 10 are supported on the vertical supports described above, but in the load space 19 the walls are supported on the sides 30. In between, the transfer carriage 27 is used to move empty buffer frames to be filled and to receive filled buffer frames next to the transfer device 18 ready for the next loading. In FIG. 8, the transfer device 18 has pulled the loading frame 10 out of the load space 19, while the articles 13 remain in the load space 19. The filling of the loading frame can be started immediately. Several systems can be arranged in parallel. One transfer carriage can then be used to feed several transfer devices. If the height is sufficient, buffer frames can also be set on top of each other to await moving to the transfer device. The transfer carriage is then of a stacking type. The transfer carriage's track is preferably on the floor, but it is also possible to use a transfer carriage supported from the ceiling. The question is then of a kind of hoist, which can take any buffer frame whatever to be moved to the buffer bar.

Figure 9:
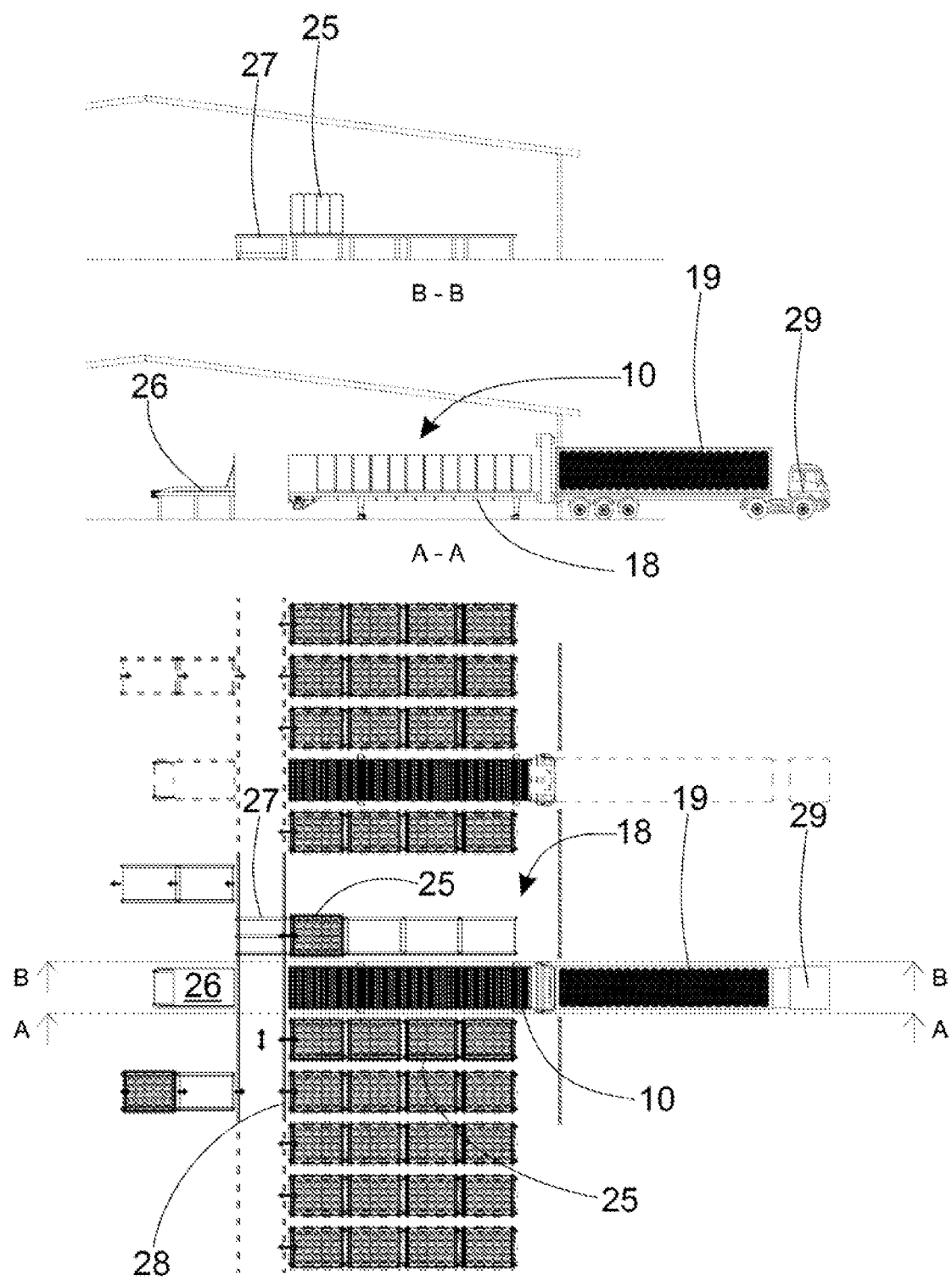
FIG. 9 shows a variation of the system according to the invention in the stage of FIG. 8.

FIG. 9 shows a variation of the system according to the invention, the operating principle of which corresponds to that described above. Here the buffer frames 25 are in four rows next to the transfer device 18. Rows can be added as required. At the same time the transfer carriage's 27 track 28 is extended.

Utilizing the sliding-plate technique and if necessary flexible joints, a flexible loading frame is created for loading tyres, sacks, and other articles requiring support or protection. At the same time, the system remains simple, but loading is quick. In addition, a base and walls implemented using the sliding-plate technique minimizes the space taken by the loading frame. Thus the load space is loaded as full as possible. The loading frame is particularly suitable for articles liable to topple, the stack shape of which is maintained by supporting the articles from the sides. Using the rick-rack loading pattern tyres are placed more densely, but the stacks are more liable to topple. The material of the base and walls is preferably slippery plastic, which withstands pulling and pushing and which has suitable friction and wear properties. For example, tyres do not permit any kind of wear, so that freely rotating rollers are nearly essential on the base and sides. In any event, the loading frame prevents articles from spreading and striking the walls of the load space. Thus the loading frame also protects the articles from damage.

A suitably flexible loading frame flexes and conforms to possible differences in height between the transfer device and the load space. The base's sliding plate is unified and flexible in nature. In one embodiment of the loading frame, the wall consists of components that are attached to the base and each other by flexible connections. FIGS. 2a and 2b show a floating and sliding joint. The components can also be pivoted to each other.

The loading frame is handled by a transfer device, so that an operating-power apparatus accompanying the loading frame is unnecessary. At the same time, the transfer device's body support the flexible loading frame. In addition, the loading frame's walls too are supported on the transfer device. During loading, the loading frame is supported on the load space's sides and/or the articles being loaded. Thus the outer surfaces of the slipper-plastic walls permit the loading frame to be moved, even through the walls are supported on the sides of the load space.

The configuration of the system can be adapted as required. The desired number transfer devices can be set, as can buffer frames and their locations in the vicinity of the transfer device. The loading capacity can then be adapted to production, so that actual storage is minimized. For example, production can be continuous, but loading can take place during only part of the day. The production numbers and dispatch numbers are, however, the same on a daily basis, so that part of production should be stored somewhere before dispatch starts. In the method according to the invention, this need is met by the buffer frames, which are then placed near the transfer device. At the same time, articles can be rapidly moved from the buffer frames to the loading frame and then to the load space, when the loading time of the transport means can be minimized. If production is in three shifts, but loading only in two shifts, then one shift's production is buffered in the system according to the invention. For example, 60 truck-loads in one day means 20 loads during one shift. During the remaining two shifts 40 loads are then produced and all 60 loads are dispatched.

The invention claimed is:

1. Loading frame for loading articles into a load space which is standard without any accessories for loading, the loading frame being moveable into the load space and out of the load space while articles remain in the load space and comprising a base and two flexible walls arranged on opposite sides of the base, the base and flexible walls being of a flexible non-driven slippery plastic permitting sliding movement between the walls and sides of the load space when the flexible walls are supported on the sides of the load space and the base and each wall are arranged to permit movement between the articles and the loading frame.

2. Loading frame according to claim 1, one or both walls are formed of parallel components, which are jointed flexibly to each other.

3. Loading frame according to claim 1, the inner surface of the base is covered with freely rotating rollers.

4. Loading frame according to claim 1, the inner surface of each wall is covered with freely rotating rollers.

5. System for loading articles into a load space, the load space being standard without any accessories for loading, the system comprising a loading frame including a base and two flexible walls arranged on opposite sides of the base, the base and flexible walls being of a non-driven flexible slippery plastic, and a transfer device, which is arranged to both move the loading frame together with the articles into a load space and to move the loading frame out of the load space while the articles remain in the load space, the flexible walls permitting sliding movement between the flexible walls and the side of the load space, when the flexible walls are supported on the sides of the load space and the base and each wall are arranged to permit movement between the articles and the loading frame.

6. System according to claim 5, wherein the transfer device is arranged outside the load space as an extension of the load space, the loading frame being open at the ends.

7. System according to claim 5, wherein the system includes buffer frames as well as a buffer bar for moving articles from a buffer frame to the loading frame.

8. System according to claim 7, wherein the system includes a transfer carriage for moving a buffer frame to the loading frame arranged at the location of the transfer device.

9. System according to claim 8, wherein the transfer carriage is of a stacking type.

10. Method for loading articles into a load space which is standard without any accessories for loading, wherein articles are loaded into a loading frame, which includes a base and two flexible walls arranged on opposite sides of the base, the base and flexible walls being of a flexible non-driven slippery plastic, and the loading frame together with the articles is moved into the load space, and the flexible walls permit sliding movement between the walls and the side of the load space, when in the transfer of the loading frame the flexible walls are supported on the articles and/or on the sides of the load space and the base and each wall are arranged to permit movement between the articles and the loading frame.

11. Method according to claim 10, wherein the loading frame is moved out of the load space while the articles remain in the load space.

12. Method according to claim 10, wherein, before loading the load space, the loading frame is filled using pre-filled buffer frames.

13. Method according to claim 10, wherein, in the method, the base and each wall are arranged to permit movement between the articles and the loading frame and a transfer device is arranged to both move the loading frame together with the articles into a load space and to move the loading frame out of the load space while the articles remain in the load space.

* * * * *